(12) United States Patent
Mocanu

(10) Patent No.: US 8,832,289 B2
(45) Date of Patent: Sep. 9, 2014

(54) WIRELESS NETWORK CONNECTION SYSTEM AND METHOD

(75) Inventor: Iulian Mocanu, Langley (CA)

(73) Assignee: NETGEAR, Inc., San Jose, CA (US)

( * ) Notice: Subject to any disclaimer, the term of this patent is extended or adjusted under 35 U.S.C. 154(b) by 10 days.

(21) Appl. No.: 13/180,835

(22) Filed: Jul. 12, 2011

(65) Prior Publication Data

US 2012/0185606 A1 Jul. 19, 2012

Related U.S. Application Data

(60) Provisional application No. 61/363,972, filed on Jul. 13, 2010.

(51) Int. Cl.
*G06F 15/16* (2006.01)
*H04L 29/08* (2006.01)
*G06F 9/44* (2006.01)
*G06F 1/00* (2006.01)
*H04L 12/40* (2006.01)
*G06F 15/177* (2006.01)
*H04L 12/28* (2006.01)
*G06F 13/10* (2006.01)
*H04W 88/12* (2009.01)
*G06F 9/455* (2006.01)

(52) U.S. Cl.
CPC .............. *G06F 1/00* (2013.01); *H04W 88/12* (2013.01); *H04L 67/34* (2013.01); *G06F 9/4411* (2013.01); *G06F 2009/45579* (2013.01); *H04L 12/40* (2013.01); *G06F 15/177* (2013.01); *H04L 12/2898* (2013.01); *G06F 13/102* (2013.01)
USPC ........................................................ 709/230

(58) Field of Classification Search
CPC ...................................................... H04W 88/12
USPC ........................................................... 709/230
See application file for complete search history.

(56) References Cited

U.S. PATENT DOCUMENTS

| | | | | |
|---|---|---|---|---|
| 6,012,113 A | * | 1/2000 | Tuckner | 710/64 |
| 6,179,489 B1 | * | 1/2001 | So et al. | 718/102 |
| 6,298,370 B1 | * | 10/2001 | Tang et al. | 718/102 |
| 6,697,372 B1 | * | 2/2004 | McAlear | 370/402 |
| 7,873,726 B2 | * | 1/2011 | Ofir et al. | 709/224 |
| 8,347,012 B2 | * | 1/2013 | Goss et al. | 710/261 |
| 2003/0226015 A1 | * | 12/2003 | Neufeld et al. | 713/166 |
| 2011/0117909 A1 | * | 5/2011 | Cao et al. | 455/423 |

* cited by examiner

*Primary Examiner* — Kristie Shingles
(74) *Attorney, Agent, or Firm* — Boyle Fredrickson, S.C.

(57) ABSTRACT

The present invention provides a device, system, method and computer-program product for transferring information between a host computer and a wireless network. The device and system comprise an operatively linked mass storage module and modem module. The mass storage module is configured to transfer information with a host computer. The modem module is configured to transfer information with one or more wireless networks. Communication between the host computer and the mass storage module is at least in part using file system input/output protocols. One or more virtual drivers are provided on the host computer to enable communication with the modem module without installation of modem specific drivers.

20 Claims, 4 Drawing Sheets

WIRELESS NETWORK CONNECTION SYSTEM AND METHOD

CROSS REFERENCE TO RELATED APPLICATIONS

This application claims the benefit under 35 U.S.C. §119(e) to U.S. Provisional Application No. 61/363,972, filed Jul. 13, 2010. The disclosure of which is considered part of and is incorporated by reference in the disclosure of this application.

FIELD OF THE INVENTION

The present invention generally pertains to wireless modem devices, systems and methods for enabling communication between a host computer and a wireless network.

BACKGROUND

Various kinds of wireless modem devices are currently available for enabling a host computer to connect to a wireless network. The wireless modem devices are configured with various types of physical interfaces such as Universal Serial Bus (USB), PCMCIA, PCI, Firewire and the like, for connection to a complementary port provided on the host computer.

Generally, the host computer requires custom device drivers for operation of such wireless modem devices. Driver software serves to provide information that enables the host computer system to configure, control and/or operate the wireless modem device. Driver software has traditionally been distributed to users via accompanying memory devices such as floppy disks, CDs or DVDs shipped along with the electronic device, or via the Internet. A number of wireless modem devices are preconfigured to provide at least some information needed for their operation in combination with predetermined types of host computer systems in a memory included in the wireless modem device itself so that an accompanying memory device or an Internet connection is not required for their first time operation. The driver software provided with the device is typically installed on the host computer upon connection of the wireless modem device and is also typically retained therein after the initial installation. The driver software, however, needs to be installed on every new host computer that a wireless modem device may be connected to.

In one class of USB wireless modem devices, the wireless modem device operates in a mass storage device mode for installation of the modem specific device drivers, and then switches to a modem mode for operation after installation of the device drivers has been completed. The host computer is then able to communicate with the modem device over the USB using a combination of TCP/IP networking protocol and Network Driver Interface Specification (NDIS) standard.

Most types of host computer Operating System (OS) offer native support for TCP/IP Internet communication protocol drivers and USB drivers for communication using a USB physical interface. However, in some instances custom device drivers have to be installed for modem operation. The connection manager and the associated software required for installation of custom drivers on the host computer system are typically stored in the memory of the wireless modem. For such devices, the custom device drivers are typically Plug-n-Play (PnP) drivers that may require a relatively lengthy hardware discovery process. Furthermore, the process of switching from one mode to another may prove to be unreliable and/or somewhat time consuming during the normal use of the device.

In another class of wireless modem devices which are configured to be connected to a host computer's USB port, a Remote Network Driver Interface Specification (RNDIS) is used in combination with USB protocol for communication between the USB wireless modem device and the host computer. RNDIS is a Microsoft proprietary standardized specification for USB network devices and is often supported as a standard component of Windows operating systems. Typically, for the operation of peripheral devices with RNDIS, an RNDIS library is loaded on to the peripheral device. Upon connection to the host computer, the peripheral device exposes an RNDIS interface enabling communication using this standard. However, operation of peripheral devices with RNDIS also requires installation of custom device drivers for the peripheral devices.

Yet another class of USB wireless modem device known in the art sets up a modem host communication interface and uses a proprietary user mode protocol stack to send data through the modem host communication interface and thereby to and from the wireless network. A proxy application is used to route information from the host computer's TCP/IP to the proprietary protocol stack. The design and development of proprietary protocols for implementation in modem devices, however, can be a complicated task and furthermore user mode communication protocol stacks can be inferior to some OS vendor provided stacks in terms of flexibility, reliability and performance.

The prior art devices typically involve installation of device specific drivers and a lengthy hardware discovery process or the development of proprietary communication protocols and associated software which can be also be complicated and uneconomical. Therefore there is a need for a wireless modem device that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system for transferring information between a host computer and a wireless network, said system comprising: a mass storage module operatively linked to said host computer system via a mass storage device communication module provided on said host computer system, said mass storage device communication module configured to obtain data from and provide data to said host computer system; a modem module operatively linked to said mass storage module and configured to receive data from and send data to said wireless network; and a virtual modem module comprising one or more virtual driver modules configured to enable communication between said host computer system and said modem module, said communication performed at least in part using a communication protocol for reading and writing files.

According to another aspect of the present invention there is provided a wireless communication device for transferring information between a host computer and a wireless network, said wireless communication device comprising: a mass storage module, said mass storage module configured to be operatively linked to said host computer system via a mass storage device communication module provided on said host computer system, said mass storage device communication module configured to obtain data from and provide data to said host computer system; a modem module operatively linked to said mass storage module and configured to receive data from and send data to said wireless network; and a virtual modem module comprising one or more virtual driver modules stored on said mass storage module and configured to enable communication between said host computer system and said modem module, said communication performed at least in part using a communication protocol for reading and writing files.

According to another aspect of the present invention there is provided a method for transferring information between a host computer and a wireless network using a wireless communication device which includes a mass storage module and an operatively linked modem module configured to send and receive data from the wireless network, the method comprising coupling the wireless communication device to said host computer using a mass storage communication module, thereby operatively connecting the mass storage module and modem module to the host computer; presenting a virtual modem module to the host computer comprising one or more virtual driver modules configured to enable communication between said host computer system and said modem module; and communicating between the host computer and the modem module, said communicating performed at least in part using a protocol for reading and writing files; thereby transferring information between the host computer and the wireless network.

According to another aspect of the present invention there is provided a computer-program product for transferring information between a host computer and a wireless network using a wireless communication device which includes a mass storage module and an operatively linked modem module configured to send and receive data from the wireless network, said computer program product comprising code which, when loaded into a memory and executed on an associated processor, is adapted to perform the following: coupling the wireless communication device to said host computer using a mass storage communication interface, thereby operatively connecting the mass storage module and modem module to the host computer; presenting a virtual modem module to the host computer comprising one or more virtual driver modules configured to enable communication between said host computer system and said modem module; and communicating between the host computer and the modem module, said communicating performed at least in part using a protocol for reading and writing files; thereby transferring information between the host computer and the wireless network.

DETAILED DESCRIPTION OF THE INVENTION

Unless defined otherwise, all technical and scientific terms used herein have the same meaning as commonly understood by one of ordinary skill in the art to which this invention belongs.

The present invention provides a system, method and wireless communication device for transferring information between a host computer and a wireless network. The system comprises a mass storage module and an operatively linked modem module, which itself is configured to send and receive information to and from the wireless network. The mass storage module is operatively coupled to the host computer by means of a mass storage device communication module. A virtual modem module is provided for enabling communication between the host computer and the modem module wherein the communication is at least in part performed using a communication protocol for reading and writing files.

The wireless communication device comprises an operatively linked mass storage module and a modem module. The mass storage module is configured to enable communication with a host computer and the modem module is configured to enable communication with a wireless network thereby enabling transfer of information between the host computer and the wireless network.

The present invention provides a method of transferring information between a host computer and a wireless network. The method is implemented using a wireless communication device which includes a mass storage module and an operatively linked modem module configured to send and receive data from the wireless network. The method comprises coupling the wireless communication device to the host computer via a mass storage device communication module thereby operatively connecting the mass storage module and modem module to the host computer. Subsequently, presenting a virtual modem module to the host computer for enabling communication between the host computer and the modem module. The method further includes the step of communicating between the host computer and the modem module thereby transferring information between the host computer and the wireless network, wherein this communication is performed at least in part using a protocol for reading and writing files.

Wireless Communication Device and System

Figure 1:
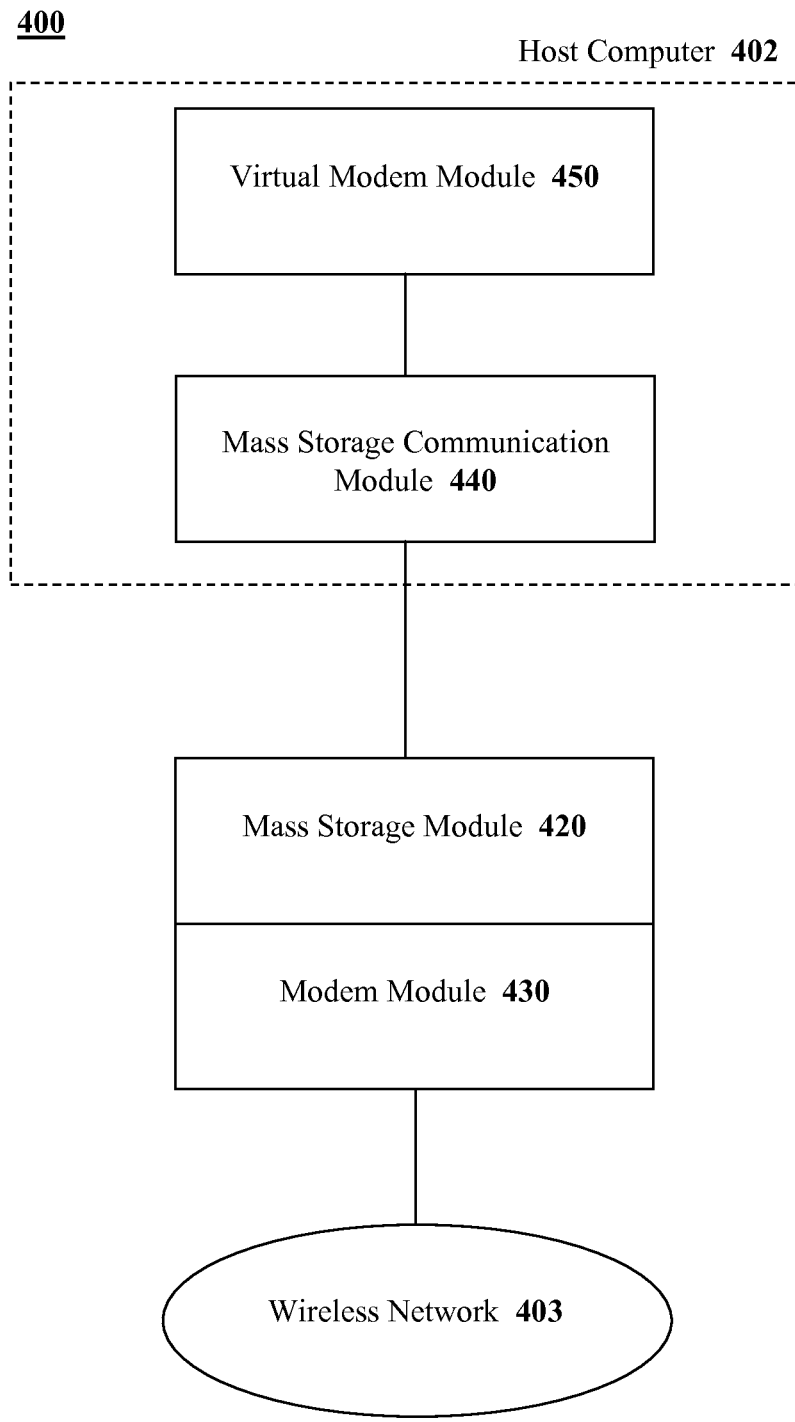
FIG. 1 illustrates a block diagram of an exemplary system in accordance with embodiments of the present invention.

The present invention provides a system for transferring information between a host computer and a wireless network. FIG. 1 illustrates a block diagram of the system 400 according to some embodiments of the present invention. The system 400 enables transfer of information between a host computer 402 and a wireless network 403. The system 400 comprises a mass storage module 420 and an operatively linked modem module 430. The mass storage module 420 is operatively linked to the host computer 402 by means of a mass storage device communication module 440 and a virtual modem module 450 on the host computer 402. The virtual modem module 450 enables communication between the host computer 402 and the modem module 430 wherein the communication is at least in part using a communication protocol for reading and writing files. The modem module 430 is configured to send and receive information to and from the wireless network 403.

The present invention also provides a wireless communication device for transferring information between a host computer and a wireless network. The wireless communication device comprises an operatively linked mass storage module and a modem module. In embodiments, the mass storage module enables communication with a host computer via a mass storage communication module thereby enabling transfer of information between the host computer and the wireless communication device. The modem module is configured to enable communication between the wireless communication device and a wireless network thereby enabling transfer of information between the host computer and the wireless network.

The host computer, as used herein, can be one of a variety of electronic devices such as a personal computer, laptop, tablet computer, PDA or the like as will be readily understood by a worker skilled in the art. The host computer may be a substantially stationary device or it may be a mobile device. The host computer is provided with an operating system comprising information and executable code that enables the host computer to perform a set of functions. Operating systems according to embodiments of the present invention, may include software, firmware, predetermined data and/or other information which may be used by a combination of a host computer and a connected electronic device, in order to control, configure, operate and/or otherwise affect the electronic device or the host computer during operation.

In addition to the operating system, the host computer may comprise one or more software applications configured to perform particular functions or tasks as will be readily understood to a worker skilled in the art. Exemplarily, the applications can include web browsing applications such as Firefox™, email applications such as Outlook™ and word processing applications such as Microsoft Word™ and/or the like. In some embodiments, the software applications and the host computer may be capable of receiving input data and sending output data to and from a user or another computer.

The wireless network may be any WWAN or WLAN network using any communication technology and protocol such as 802.11b, 802.11g, 802.11n, Global Systems for Mobile communications (GSM), General Packet Radio Service (GPRS), Code Division Multiple Access (CDMA) technologies, Wideband CDMA (WCDMA), High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi or WiMAX, 3G, 3.5G, 4G or based on other communication standard and technology that may be known to a person skilled in the art.

The wireless communication device (WCD), as used herein, is an electronic device comprising electronic components that enable connection to one or more other electronic devices such as host computers and to a wireless network. Accordingly, the WCD comprises electronic components for short-range and long-range communication. Exemplarily, short range communication with a host computer can be achieved using a USB connection and long range communication with a remote server can be achieved using an RF transceiver and Global System for Mobile Communication (GSM) protocol, however other configurations/standards for short range and/or long range communication would be readily understood by a worker skilled in the art. In addition to the physical components for enabling short and long range communications, the WCD also comprises information (such as instructions and configuration settings) necessary for operation of the WCD and its connection with different devices, for example, different host computers.

As mentioned above, the WCD is communicatively or operatively linked to a host computer. The WCD and host computer are accordingly provided with communication modules comprising physical components and software drivers for communication using communication protocols appropriate for the connection system used.

The WCD may be configured to be linked to a host computer by means of a wireless or hardwired connection. For example, the WCD may be linked to a host computer via a USB connection or a Bluetooth™ connection or the like. The WCD may be externally or internally connected to a host computer. Examples of connection systems that may be used for connecting a WCD to a host computer include but are not limited to Universal Serial Bus (USB), PC Card, Express Card, PCMCIA, Firewire, AGP, PCI, PCI II or other connection system that would be readily known to a worker skilled in the art. A worker skilled in the art will also readily understand that a hardwired connection may be enabled either by the provision of complementary ports on the wireless communication module and the host computer or by the use of an appropriate cable to connect ports of the WCD and host computer at respective ends of the cable.

In some embodiments, the WCD is configured with one or more connection systems for coupling to a host computer. The connection system provided or used for operation may be based on a one or more factors including desired performance characteristics, for example, speed, bandwidth and frequency of usage, cost, compatibility with host computer hardware or operating system, physical form factor limitations and the like.

The WCD comprises a mass storage module comprising memory exemplarily including ROM, PROM, EPROM, EEPROM, magnetic RAM, FLASH, or other volatile or non-volatile memory. The mass storage module may be configured for read-write operations and may also comprise portions that are read-only. The mass storage module may be used to store data and information necessary for configuration and operation of the WCD. In some embodiments, the mass storage module is used for communicating with the host computer. Accordingly, in some embodiments, information (such as modem commands and data) sent and received from the WCD are read from and written to the mass storage module.

The WCD comprises a modem module that enables communication with one or more wireless networks. The modem module may include one or more transceivers such as a radiofrequency (RF) transceiver for communicating wirelessly with a remote device such as a base station of a wireless network, a peer computer or a remote server. The base station may be a cellular base station, wireless access point, or the like. In some embodiments, the host computer may be a mobile device and the base station may change as the mobile device travels. In some embodiments, the modem module may be capable of operation using multiple communication protocols and technologies.

The modem module, base station, and other network components may be configured for data communication, voice communication, or a combination thereof, which may be enabled using additional components, configurations and/or procedures where appropriate, such as SIM cards, authorization and authentication procedures, handoff procedures, and the like, as would be readily understood by a worker skilled in the art.

As mentioned above, the host computer sends and receives data from a wireless network using the WCD. In general, the host computer operating system uses a networking communication protocol to communicate with other networked devices and is accordingly, provided with appropriate driver software required for performing this communication. In some embodiments, the host computer operating system may comprise a Transmission Control Protocol/Internet Protocol (TCP/IP) module for communication using TCP/IP communication protocol.

In some embodiments, the host computer is exposed to the mass storage interface of the WCD and communicates with the WCD via the mass storage module. In some embodiments, the host computer only communicates with the WCD via the mass storage module. In some embodiments, the host computer may be additionally configured to communicate directly with the modem module of the WCD. The host computer operating system is also generally provided with built-in or preinstalled drivers for communicating with standard mass storage devices such as flash memory devices, CDs, DVDs, other optical disc drives, magnetic drives and magneto-optic disc drives and the like. Accordingly, the host computer can communicate with the WCD using a mass storage device communication module comprising one or more mass storage device drivers.

The system further comprises a virtual modem module comprising one or more virtual driver modules. The virtual driver modules are installed on the host computer for operation, and configured to present a virtual modem interface to the host computer. In some embodiments, the virtual modem module enables communication between the host computer and the modem module via the mass storage module. The communication is achieved at least in part using communication protocols for reading and writing files.

In some embodiments, the virtual driver modules are stored on the WCD and loaded onto the host computer for operation. In some embodiments, the virtual driver modules are stored on the mass storage module of the WCD and loaded on the host computer for operation. A worker skilled in the art will readily understand that the installation or loading of virtual device drivers does not entail a hardware discovery process and is thus a faster process than device driver installation.

Figure 2:
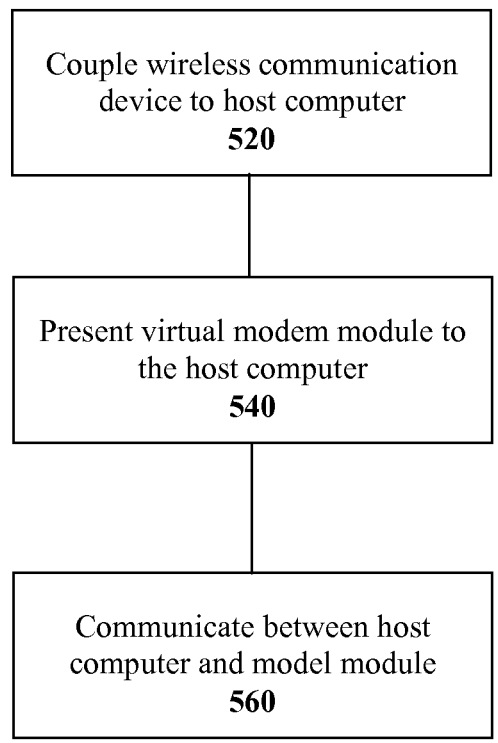
FIG. 2 illustrates a flow diagram of an exemplary method in accordance with embodiments of the present invention.

FIG. 2 shows a flowchart of a method of transferring information between a host computer and a wireless network in accordance with some embodiments of the present invention. The method 500 is implemented using a wireless communication device which includes a mass storage module and an operatively linked modem module configured to send and receive data from the wireless network. The method 500 comprises coupling 520 the wireless communication device to the host computer using a mass storage communication module, thereby operatively connecting the mass storage module and modem module to the host computer; presenting 540 a virtual modem module to the host computer comprising one or more virtual driver modules enabling communication between the host computer and the modem module; and communicating 560 between the host computer and the modem module, said communicating performed at least in part using a protocol for reading and writing files; thereby transferring information between the host computer and the wireless network.

Coupling and Connecting of Wireless Communication Device and Host Computer

As mentioned above, the WCD is operatively connected to the host computer. In some embodiments, the connection is achieved by a hardwired link. In some embodiments, the link is made by connecting the WCD to a complementary port on the host computer. In some embodiments, the connection is made by using a cable to connect matching ports of the host computer and WCD. For example, the WCD may be provided with a USB interface and connected to a complementary port of the host computer. In some embodiments, a wireless link and communication protocol may be used to connect the WCD and host computer. In some embodiments, the wireless link between the WCD and the host computer is a short-range wireless connection, for example, the WCD may be connected to the host computer using a communication protocol like Bluetooth or Zigbee or other relatively short range communication protocol as would be readily understood by a worker skilled in the art.

Accordingly, the WCD as well as the host computer may be provided with appropriate connection system drivers for the particular connection system utilized in order to enable communication when connected. For example, the WCD and the host computer may be connected using a USB interface, and USB drivers may be provided in order to enable communication through the USB interface using the USB communication protocol. The connection system drivers may comprise a combination of software and/or firmware and are typically stored in the ROM portion of the memory of the wireless communication module. The connection system drivers may be natively supported on the host computer and/or be preinstalled on the host computer. A worker skilled in the art will understand that the connection system drivers may however be updated as needed, for example, in order to conform to changes in protocols or security.

Mass Storage Communication Module

When the WCD is connected to the host computer, the mass storage module, or a portion thereof, is exposed to the host computer. In some embodiments, the mass storage module or a portion thereof remains exposed to the host computer as long as the connection is maintained. In some embodiments, only the mass storage module or a portion thereof is exposed to the host computer.

Accordingly, the host computer can communicate with the WCD, at least in part, via the mass storage module. A worker skilled in the art will readily understand that, in addition to drivers specific to the connection system used, the host computer and applications on the host computer require device specific drivers in order to communicate with the mass storage module of the WCD when the WCD is connected to the host computer.

The host computer uses a mass storage communication module in order to communicate with the connected mass storage module. In embodiments, the mass storage communication module comprises mass storage drivers that enable the host computer to communicate with the connected mass storage module. Examples of such mass storage drivers include CD, DVD, Flash memory drivers and the like. For example, the host computer may use a USB Flash memory driver to transfer information to and from the WCD using a USB and Flash memory communication standard when the mass storage module of the WCD is Flash memory and the connection to the host computer is via USB.

Virtual Modem Module

The virtual modem module presents a virtual modem interface to the host computer and applications and users of the host computer. The virtual modem module communicates with the host computer and applications on the host computer using a network communication protocol similar to a real modem device. Communications between the virtual modem module and the modem module of the wireless communication device, however, can occur via the mass storage module and therefore use a file system input/output protocol instead of a network protocol. Accordingly, the virtual modem module serves to direct data traffic from the host computer networking protocol stack to a file system protocol stack. For example, the network protocol communications may be configured in TCP/IP protocol and file system protocol communications may be SCSI communications.

An advantage provided by the system, device and method according to the present invention is that, by using a virtual modem module and by communicating between the host computer and the wireless modem module using a file system communication protocol, for example via the mass storage module, that is natively supported by most host computer operating systems, the WCD may be operated without installation of Plug-n-Play device drivers on the host computer, thereby enabling operation of a WCD in a more expedient manner upon initial interconnection thereof with the host computer.

The virtual modem module comprises one or more virtual device drivers that enable virtualization of a modem interface to an application or a user on the host computer. The virtual device drivers may include, for example, a Virtual Network Driver Interface Specification (VNDIS), a Virtual COM port (VCOM), a Kernel Mode Virtual Network Driver (KMVND) or other device drivers needed to establish a connection between a host computer and a modem as will be readily understood by a worker skilled in the art. The virtual device drivers may be user space or kernel space virtual device drivers.

The virtual modem interface created by a virtual modem module may be presented to applications or users on the host computer. In embodiments, the virtual modem interface is presented to a subset of the applications or users on the host computer. The subset of applications allowed access to the virtual modem module and thus to the modem module may be predetermined. For example, the access could be allowed based on the application or the user's authorization level or the application. In some embodiments, the subset of applications is selected based on a user specification.

In some embodiments, the virtual modem module may at least in part be operated by the WCD. The virtual modem module may be operated by the host computer system, the WCD or both.

Installation of Virtual Device Drivers

In some embodiments, the virtual device drivers (VDD) associated with the virtual modem module are not already present in the operating system of a host computer and thus need to be installed on the host computer. Accordingly, in some embodiments, presenting a virtual modem module to the host computer comprises installing the virtual modem module on the host computer. A worker skilled in the art will readily understand that installation of a VDD typically does not require hardware discovery and can thus be performed considerably faster than installation of specific device drivers.

In embodiments, one or more VDDs are instantiated on the host computer. In embodiments, one or more VDDs are installed dynamically and programmatically on the host computer. VDDs may be loaded on the host computer by a user or automatically without user input. For example, installation of VDDs for the virtual modem module may be initiated by a user or be automatically installed upon connection of the wireless communication device to the host computer. In some embodiments, a VDD may be loaded with the use of an application programming interface or service, such as a Connection Manager application. In some embodiments, the Connection Manager application is a wrapper application, for example, the Connection Manager application may be a wrapper application that uses HTML content and java applets in browser control.

According to some embodiments of the present invention, the virtual modem module or one or more VDDs associated with the virtual modem module may be stored on the wireless communication device. In some embodiments, the virtual modem module or portions thereof may be configured for transfer to a host computer system for operation.

In some embodiments, the virtual modem module may be at least in part, provided in memory included in the wireless communication device. In addition, this memory may be part of the mass storage memory module associated with the wireless communication device or it may be a different memory.

Communication Using File System Protocol

The host computer communicates with the modem module via the virtual modem module. In some embodiments, the virtual modem module communicates with the modem module via the mass storage module. In some embodiments, the communication between the host computer and the modem module is performed at least in part using file system protocols. In some embodiments, the type of communication used by the virtual modem module and associated drivers may be classified as reading information from the mass storage module and writing information to the mass storage module. As mentioned above, reading or writing information to the mass storage module may be performed using file read and write commands and communication protocol. Examples of such protocols include SCSI, Serial ATA or Parallel ATA.

Information can be obtained from the modem and mass storage modules by performing FileRead operations on the mass storage module. Information may be obtained from the mass storage module by reading from a predetermined block, file or the like. Information obtained may comprise information related to modem operation such as modem status and modem configuration settings as well as other information received over the wireless network.

In some embodiments, information can be sent to the modem module and thus transmitted to the wireless network by performing FileWrite operations. Information to be written or sent to the modem module includes modem commands (AT commands, for example) and other data to be transmitted over the wireless network to a remote server, application or another peer computer. Executable commands for operation of the modem module may be sent to the modem module by writing modem commands to the mass storage module. In some embodiments, asynchronous communication between the modem module and the host computer can be achieved using Mode Sense SCSI commands.

In some embodiments, the host computer may communicate with the modem module using predetermined files on the mass storage module. Accordingly, when the WCD is connected to the host computer, the mass storage module may expose one or more predetermined files to be used for communication with the modem module. In some embodiments, the host computer writes information to a first predetermined file and reads information from a second predetermined file. The information written to the first predetermined file may be interpreted by the WCD to distinguish between data and executable commands to the modem module. Exemplarily, the format of the first predetermined file may be used as a flexible means to distinguish between data and commands. The mass storage module may be formatted with a file system format readily known to a worker skilled in the art. Examples of file system formats that may be used include but are not limited to Microsoft's File Allocation Table (FAT) and FAT32, CDFS, NTFS, Apple's HFS Plus, Linux's Ext2, Unix File System and the like. In embodiments, the mass storage module, or a portion thereof, may be reformatted to a different file system format based on the operating system of the host computer.

In some embodiments, the host computer may communicate with the modem module using one or more predetermined blocks or sectors of the mass storage module. A method readily available to a worker skilled in art may be used to assign one or more blocks or sectors of the mass storage module for communication with the host computer, for example, the predetermined blocks or sectors may be marked as bad blocks or sectors or allocated to hidden or system files.

It will be appreciated that, although specific embodiments of the invention have been described herein for purposes of illustration, various modifications may be made without departing from the scope of the invention. In particular, it is within the scope of the invention to provide a computer program product or program element, or a program storage or memory device such as a transmission medium, for example solid transmission medium, magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

The invention will now be described with reference to specific examples. It will be understood that the following examples are intended to describe embodiments of the invention and are not intended to limit the invention in any way.

EXAMPLES

Figure 3:
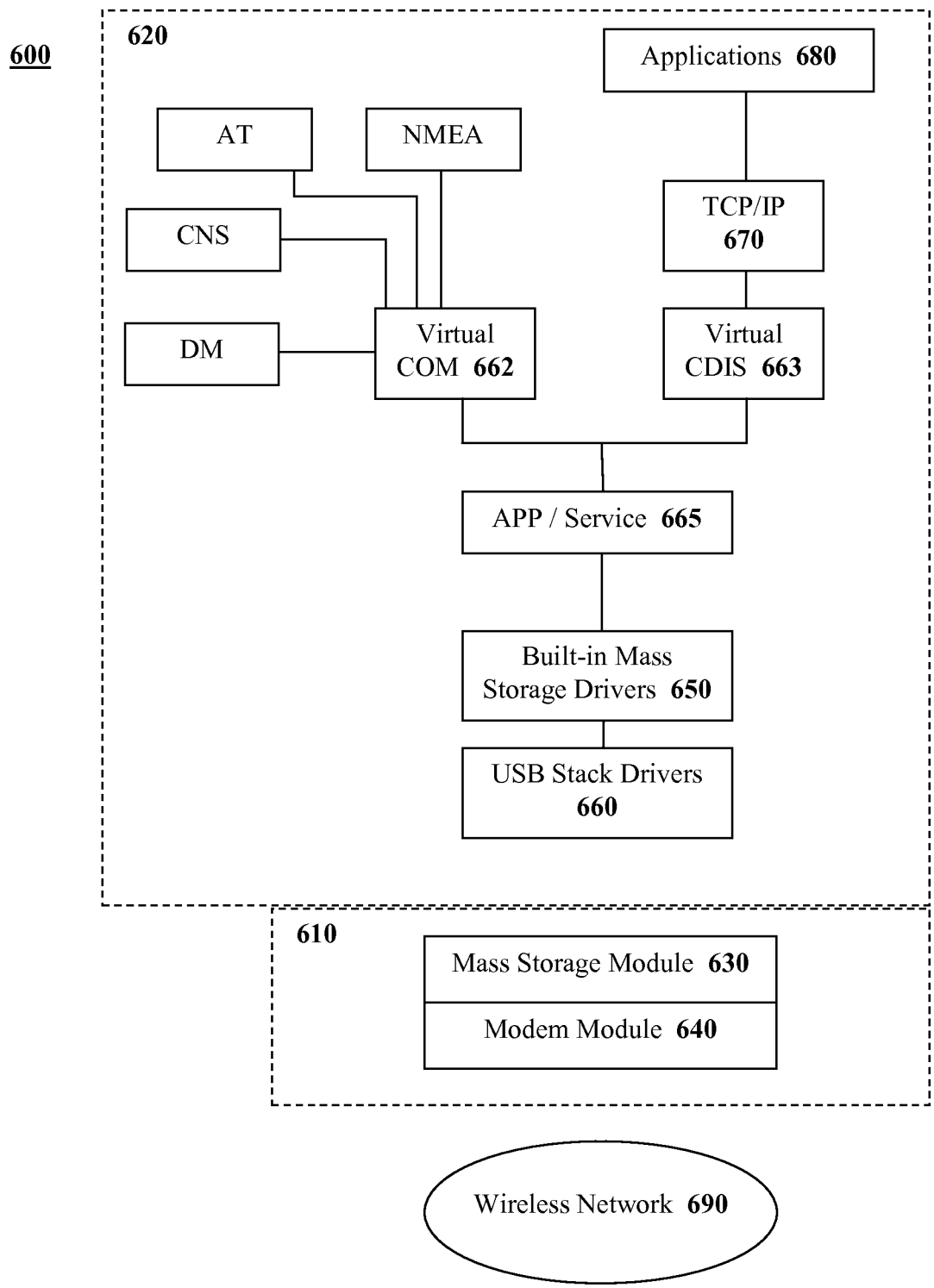
FIG. 3 illustrates a block diagram of an exemplary system in accordance with embodiments of the present invention.

FIG. 3 illustrates a block diagram of an exemplary USB wireless modem system 600 according to an embodiment of the present invention. The system 600 includes a wireless communication device 610 comprising a mass storage module 630 and a modem module 640. In this example, the wireless communication device comprises FLASH memory and a USB connector by which it is connected to the host computer's USB port. The host computer 620 in this example is a PC running on Windows operating system. The OS of the host computer 620 comprises built-in mass storage drivers 650 and USB stack drivers 660 that enable communication with the wireless communication module over the USB using USB protocol. According to embodiments, built-in mass storage drivers 650 and USB stack drivers 660 can be a component of the operating system on the host computer, for example an OS provided by Microsoft. The host computer further comprises applications 680, for example, a web browsing application such as Firefox that require transferring information to and from other networked devices or servers over the wireless network. The host computer comprises a TCP/IP module 670 that enables communications with other networked devices or servers using the TCP/IP protocol for communication, for example the TCP/IP protocol can be within the operating system, for example Microsoft, of the host computer. The wireless network 690 is a WWAN network based exemplarily on one or more of the GSM/GPRS, WCDMA, LTE or WiMAX standards. Accordingly, the modem module 640 is configured to communicate using these standards and protocols. According to embodiments, the modem module 640 is configured to have an understanding of a file system or file systems, for example one or more file systems including Compact Disc File System (CDFS), New Technology File System (NTFS), File Allocation Table (FAT), FAT32, Hierarchical File System (HFS) and the like.

The host computer is also provided with virtual device drivers (in this example, a Virtual COM port driver 662 and a Virtual NDIS driver 663) and configured such that host computer applications communicate via the VNDIS module 663 as shown in FIG. 3. For example the Virtual COM port drive 662 can have associated with it a data management (DM) component, a communication network services (CNS) component, an access transport (AT) component, an National Marine Electronics Association (NMEA) component and one or more optional additional components as required to provide the desired functionality to the Virtual COM port driver. The VNDIS drivers virtualize a modem interface to the applications of the host computer and a user on the host computer. The virtual modem drivers are configured to provide a file system I/O standard to communicate. The virtual modem drivers may be stored on the mass storage module and installed on the host computer when the wireless communication device is connected to the host computer. An application programming interface or service 665, exemplarily a Connection Manager application, may also be provided on the host computer in order to load the virtual drivers and the small computer system interface (SCSI) component.

Accordingly, when a user or application sends data to another device or server over the wireless network, the data is first sent to the TCP/IP module 670 to be configured according to TCP/IP standard, and then to Virtual NDIS module 663 to be configured for transfer to the modem module of the wireless communication device. The VNDIS module 663 moves the data traffic from the kernel mode TCP/IP stack to the USB driver stack via the built-in MSD stack for transfer to the mass storage module of the wireless communication device. The VNDIS module uses a SCSI file system input/output standard to communicate with the wireless communication module using the MSD drivers and the USB stack drivers.

Figure 4:
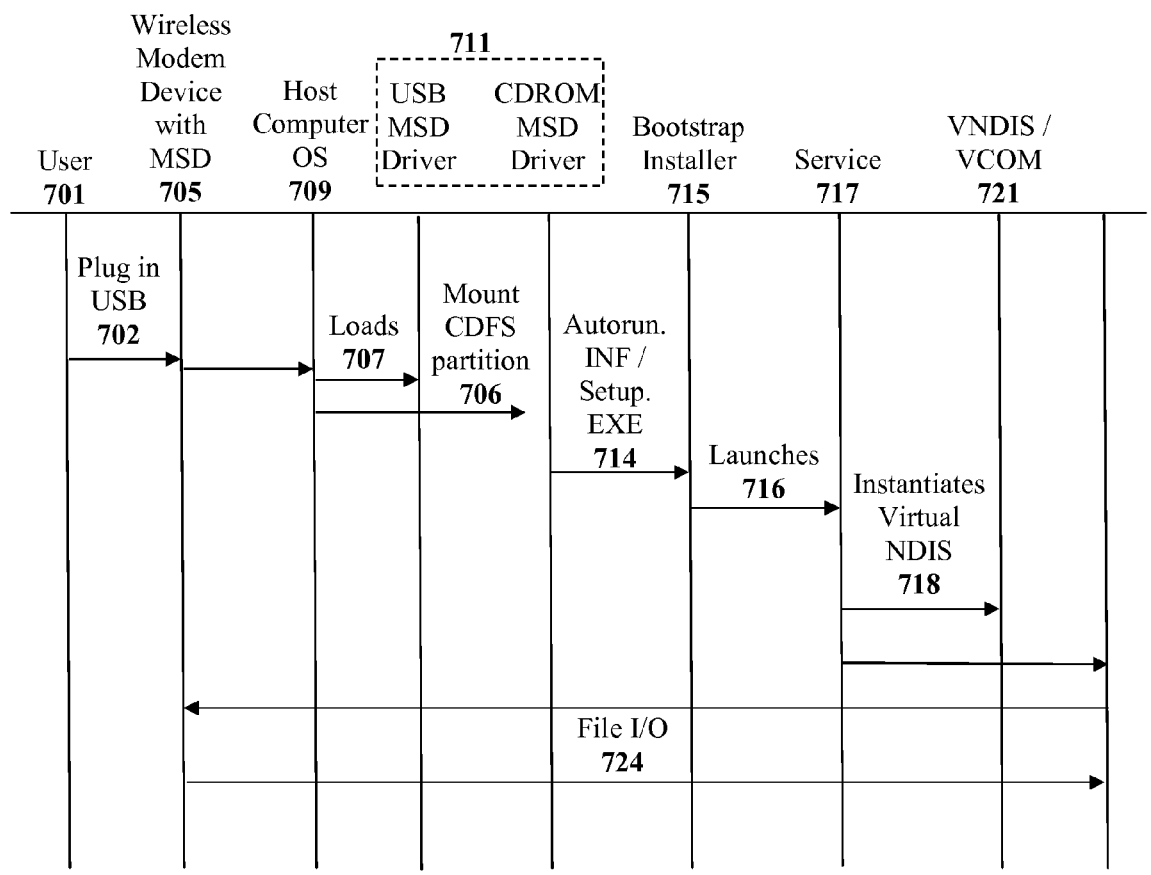
FIG. 4 illustrates a flow diagram of an exemplary method in accordance with embodiments of the present invention.

Referring to FIG. 4, a flow diagram of a method 700 of performing the initial configuration of a host computer for communication with a wireless modem device is shown. Installation of the virtual device drivers is initiated when a user 701 plugs 702 the USB wireless modem device 705, which in this example is configured as a USB wireless modem device, into the host computer's USB port. A mass storage device (MSD) interface, exemplarily a CD-ROM MSD is exposed to the computer. The host computer OS 709, for example Windows OS, upon discovery of the CD-ROM interface, loads 707 the built-in USB mass storage driver 711 which mounts the CDFS partition 706. The CDFS partition contains information and instructions to enable configuration of the host computer for communication with the wireless modem device and thereby with the wireless network.

Exemplarily, this information and instructions are stored in an autorun.inf file 714 in the root directory of the CDFS partition. The host computer OS launches the Autorun sequence by opening, reading and executing the instructions specified in this file. Exemplarily, the Autorun.inf file may specify the bootstrap installation program setup.exe as the application to run when Autorun is activated. The bootstrap installer 715 launches 716 a Connection Manager application programming interface or service 717 which instantiates 718 the virtual modem drivers 721 and configures the host computer for communication with the wireless communication module using SCSI file system protocol. Virtual modem drivers 721 exemplarily include a Virtual COM port driver and a Virtual NDIS driver, wherein the VNDIS/VCOM drivers are not configured as PnP drivers. The virtual modem drivers 721 and the mass storage device 705 communicate using file system input/output protocols 724.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A system for transferring information between a host computer and a wireless network, said system comprising:
    a mass storage module, said mass storage module operatively linked, using one of a wired or wireless communication link, to said host computer via a mass storage device communication module provided on said host computer, said mass storage device communication module configured to obtain data from and provide data to said host computer;
    a modem module operatively linked to said mass storage module and configured to receive data from and send data to said wireless network; and
    a virtual modem module provided on said host computer;
    wherein instructions stored in the mass storage module configure said virtual modem module to communicate between said host computer and said modem module via said mass storage device communication module, said communication being performed, at least in part, using a file system communication protocol for reading and writing files that does not require the installation of drivers specific to the modem module, wherein the host computer communicates with the modem module through the virtual modem module.

2. The system according to claim 1, wherein the mass storage module is operatively linked to said host computer system via a Universal Serial Bus (USB).

3. The system according to claim 1, wherein the virtual driver module is stored on the mass storage module and is provided to said host computer.

4. The system according to claim 1, wherein the communication protocol for reading and writing files is Small Computer System Interface (SCSI).

5. The system according to claim 1, wherein the virtual modem module is configured using the virtual driver module.

6. The system according to claim 1, wherein the host computer is a laptop.

7. The system according to claim 1, wherein the wireless network is a WLAN.

8. The system according to claim 1, wherein the host computer communicates with the virtual modem using TCP/IP communication protocol.

9. The system according to claim 1, wherein the instructions are stored in a Flash memory of the mass storage module.

10. A wireless communication device for transferring information between a host computer and a wireless network, said wireless communication device comprising:
    a mass storage module, said mass storage module configured to be operatively linked, using one of a wired or wireless communication link, to said host computer via a mass storage device communication module provided on said host computer, said mass storage device communication module configured to obtain data from and provide data to said host computer; and
    a modem module operatively linked to said mass storage module and configured to receive data from and send data to said wireless network;
    wherein instructions stored in the mass storage module configure a virtual modem module, provided on said host computer, to communicate between said host computer and said modem module via said mass storage device communication module, said communication being performed at least in part using a file system communication protocol for reading and writing files that does not require the installation of drivers specific to the modem module, wherein the host computer communicates with the modem module through the virtual modem module.

11. The device according to claim 10, wherein the mass storage module is operatively linked to said host computer system via Universal Serial Bus (USB).

12. The device according to claim 10, wherein the communication protocol for reading and writing files is Small Computer System Interface (SCSI).

13. The wireless communication device according to claim 10, wherein the virtual modem module is configured using one or more virtual driver modules.

14. The device according to claim 13, wherein the virtual driver modules are stored on the mass storage module and provided to said host computer.

15. A method for transferring information between a host computer and a wireless network using a wireless communication device which includes a mass storage module and an operatively linked modem module configured to send and receive data from the wireless network, the method comprising:
    coupling the wireless communication device to the host computer via a mass storage communication module provided on the host computer, thereby operatively connecting the mass storage module and modem module to the host computer, using one of a wired or wireless communication link; using instructions stored in the mass storage module, configuring a virtual modem module provided on the host computer to communicate between the host computer and the modem module via the mass storage communication module; and
    communicating between the host computer and the modem module, the communicating being performed at least in part using a file system protocol for reading and writing files that does not require the installation of drivers specific to the model module, wherein the host computer communicates with the modem module through the virtual modem module.

16. The method according to claim 15, wherein the virtual modem module is configured using one or more virtual driver modules.

17. The method according to claim 16, wherein the virtual driver modules are stored on the mass storage module and are provided to said host computer.

18. The method according to claim 17, wherein the virtual driver modules are automatically provided to said host computer for operation upon first connecting the wireless communication device to the host computer.

19. The method according to claim 17, wherein the virtual driver modules are automatically provided to said host computer for operation based at least in part on user input.

20. A computer program, stored in a non-transitory computer-readable storage medium, for transferring information between a host computer and a wireless network using a wireless communication device which includes a mass storage module and an operatively linked modem module configured to send and receive data from the wireless network, the computer program comprising code which, when loaded into memory and executed on a processor, is adapted to perform the following:
- coupling the wireless communication device to the host computer via a mass storage communication interface provided on the host computer, thereby operatively connecting the mass storage module and modem module to the host computer, using one of a wired or wireless communication link;
- using instructions stored in the mass storage module to configure a virtual modem module provided on the host computer to communicate between the host computer and the modem module via the mass storage communication module; and
- communicating between the host computer and the modem module, the communicating being performed at least in part using a file system protocol for reading and writing files that does not require the installation of drivers specific to the model module, wherein the host computer communicates with the modem module through the virtual modem module.

\* \* \* \* \*